July 5, 1960 D. W. TAYLOR 2,944,175

TELEVISION RECEIVER

Original Filed Jan. 18, 1957 2 Sheets-Sheet 1

INVENTOR.
Douglas W. Taylor,
BY
Mueller and Aichele
Att'ys.

TELEVISION RECEIVER

Original Filed Jan. 18, 1957

2 Sheets-Sheet 2

INVENTOR.
Douglas W. Taylor,
BY
Mueller and Aichele
Attys.

Patented July 5, 1960

2,944,175

TELEVISION RECEIVER

Douglas W. Taylor, Chicago, Ill., assignor to Motorola, Inc., Chicago, Ill., a corporation of Illinois Continuation of abandoned application Ser. No. 635,027, Jan. 18, 1957. This application Mar. 26, 1959, Ser. No. 802,259

17 Claims. (Cl. 313—77)

The present invention relates to electronic image systems and more particularly to apparatus for magnifying a television cathode-ray tube display, so that images comparable in size to those produced by prior art systems can be displayed with considerably less power consumption in the deflection or scanning systems. This application is a continuation of application Serial No. 635,027, filed January 18, 1957, now abandoned.

Television receiving systems, and the like, usually include a cathode-ray image reproducing tube in which a cathode-ray beam is developed and directed to a target area in the form of a fluorescent screen at the other end of the tube. The cathode-ray beam is intensity modulated in accordance with a composite video signal recovered from a received television signal, and the beam is scanned by a suitable deflection means in synchronism with the received television signal to produce an image on the viewing screen. This scanning comprises a series of frames of interlaced lines; and the deflection system produces a high frequency, line or horizontal deflection field for deflecting the cathode-ray beam in the horizontal direction and a low frequency, frame or vertical deflection field for deflecting the beam in the vertical direction. This horizontal and vertical scanning produces a two-dimension image on the viewing screen of the cathode-ray image reproducer.

As is well known, the vertical and horizontal deflection means of the cathode-ray image reproducer usually take the form of inductive windings which are respectively energized by sawtooth current waves synchronized with the re-received television signal at the horizontal and vertical deflection frequency. In order to obtain a linear sweep, the intensity of the sawtooth current wave must be linearly increased, and the power requirements of the horizontal and vertical deflection systems are considerable. This is particularly the case in present day systems in which the intensities of the horizontal and vertical deflection fields must be sufficient to cause the cathode-ray beam to be scanned through a large deflection angle in the presence of a high accelerating voltage. The power required by the horizontal or line deflection system is much greater than that required by the vertical or frame deflection system because the line deflection is operated at a much higher frequency, and the power requirement of the system increases with frequency. It is usual, for example, in present day television receivers, for one third of the total power required by the receiver to be used in the horizontal deflection system.

Attempts have been made in the past to mount a magnetic lens system into the television on the cathode-ray image reproducer to set up a fixed field to magnify the reproduced image or to cut down on the power required to sweep or scan an image of a given size. It was clear that great savings in power could be realized in an arrangement in which the deflection systems would be called upon to deflect the cathode-ray beam over only a fraction of the screen or target area, and in which a fixed magnetic lens requiring no power would magnify the image to cover the whole screen. However, theoretically, this would require a negative lens capable of setting up a circular magnetic field whose intensity is zero at the center and which increases in intensity radially outwardly from the center, with equal radial points all having the same magnetic intensity. Such a field would produce equal and undistorted magnification of the reproduced image in all dimensions. However, although concave, negative lenses are possible in optics, it is not believed possible to produce a negative magnetic lens.

It has been found that radically diverted, four-pole magnetic lens of the type disclosed in copending application Serial No. 762,201 filed September 18, 1958, in the name of the present inventor and assigned to the same assignee operating in conjunction with the image reproducer has a magnifying effect on one dimension of the reproduced image and a contracting or compressing effect of the other. It has been suggested, because of this unavoidable effect, that the horizontal dimension of the reproducer image be magnified with resulting saving in power in the horizontal deflection system, and that the power in the vertical sweep system be increased to compensate for the resulting decrease in the vertical dimension. This, however, has not proved to be commercially feasible because it has been found that only a small amount of horizontal magnification is possible without radically affecting the vertical dimension. This means that the additional power needed in the vertical deflection system to maintain the vertical dimension offsets whatever saving may be realized in the horizontal deflection system.

The magnetic lens of said copending application reverses the vertical dimension and magnifies in the horizontal dimension. This results in an improved and successful system in which both dimensions of the reproduced image are magnified by a permanent magnet or electromagnetic lens with resulting saving in both the vertical and horizontal deflection systems of the receiver. However, as noted in the copending application referred to above, although the permanent magnet magnifying lens converges the beam in the vertical direction it has a divergent effect on the beam in the horizontal direction. Such convergence vertically and divergence horizontally is desired insofar as scanning or deflection of the beam is concerning but the diverging effect also tends to spread the beam while the converging effect produces a focus or cross-over of the beam prior to its arrival at the screen so that the beam is again diverging as its arrives at the screen.

A cathode-ray tube for television receivers usually has a long neck to provide space for ion traps, focusing devices, deflection yokes and the like, which requires a more bulky cabinet than would otherwise be required. The length of the tube also is affected by the deflection system used with the tube. That is, the higher the deflecting power is, the shorter the tube may be for a picture of a given area.

It is accordingly, an object of the present invention to provide a system using permanent magnet lens to magnify the image produced by a cathode-ray image reproducer and which incorporates improved means for magnifying the deflections of the cathode-ray beam in both the vertical and the horizontal directions and also sharply focusing the beam on the screen of the image reproducer.

Another object of the invention is to provide a cathode-ray tube display apparatus in which the overall length or depth of the tube is a minimum.

A further object of the invention is to provide a cathode-ray tube display system having magnifying scanning means in which defocus is minimized.

A more general object of the invention is to provide a cathode-ray tube display apparatus which incorporates a permanent magnet system that enables large size images to be reproduced with relatively low power consumption, and in which such reproduction is achieved with the cathode-ray beam being maintained in a sharp focus.

A feature of the invention is the provision in a cathode-ray tube display apparatus of a magnetic lens system which establishes a magnetic field in the tube of the proper composition to magnify a first dimension of the reproduced image and to invert and magnify another dimension perpendicular to the first; and which apparatus includes a second magnetic lens which cooperates to produce convergence of the beam focus so that the beam will be sharply focused in the plane of the viewing screen.

In this apparatus the vertical and horizontal deflection coils may be spaced axially along the tube, with the second magnetic lens system positioned between the two deflection coils.

Another feature of the invention is the provision of a cathode-ray tube display apparatus having scanning means located a substantial distance back from the juncture of the neck and the flare of the tube to start scanning within the neck, and magnetic magnifying means located near the juncture to magnify the scanning.

A further feature of the invention is the provision of a cathode-ray tube display apparatus having a vertical yoke on the neck of the tube spaced substantially from the juncture of the neck and the flare of the tube and a magnetic deflection-magnifying lens located at the juncture of the neck and flare for inverting and magnifying the vertical deflection and magnifying the horizontal deflection from a horizontal yoke spaced closely thereto, and a pair of crossed magnetic lenses positioned between the two yokes to vertically diverge the beam focus so that the effect of magnifying lens is to focus the beam vertically on the screen of the tube. The crossed lenses also have the effect of horizontally converging the beam focus as the beam approaches the magnifying lens so that the horizontally divergent effect of the magnifying lens on the beam focus does not spread the beam horizontally as it travels from the magnifying lens to the screen.

A still further feature of the invention is the provision of a cathode-ray tube display apparatus in which the neck of the tube is bent substantially at a right angle to the centerline of the tube at a point near the juncture of the neck and the flare of the tube. Deflection yokes are positioned before the bend, and a uniform magnetic field is created across the bend by opposed poles of a magnet to turn the beam through the angle of the bend to a magnifying magnetic lens located at the juncture of the neck and flare of the tube to increase the deflection horizontally and invert and increase the deflection vertically. There also may be provided a pair of crossed focus lenses located on the far side of the magnet from the magnifying lens to compensate for defocussing effects on the beam produced by the magnet and the magnetic lens.

The invention finds utility in a display system which includes a cathode-ray tube having a neck with a source of a cathode-ray beam at one end thereof, which neck joins with a flared portion having a target area at its other end. A vertical deflection yoke is mounted on the neck away from the junction of the neck and the flare. This yoke is inverted relative to the usual vertical yoke and scans through an angle somewhat less than that required to fill the vertical dimension of the neck at the junction of the neck and the flare. A magnifying lens is positioned at this junction to invert and magnify the scan angle vertically. A crossed set of focusing magnetic lenses for diverging the beam focus vertically is positioned between the vertical deflection yoke and the magnifying lens to compensate for the converging effect on the beam focus inherent in the magnifying lens, so that the precise degree of vertical focus at the target area of the tube is obtained. A horizontal deflection or scanning yoke is positioned between the set of focusing lenses and the magnifying lens, and deflects the beam horizontally in accordance with signals impressed thereon to effect partial scanning. The magnifying lens increases the horizontal deflection to complete the scanning and also has the effect of diverging the beam focus horizontally. The focusing lenses cause the beam to be sharply converging horizontally as it arrives at the magnifying lens so that the beam has the desired focus at the target area. The neck of the tube in such a system may be bent at a sharp angle relative to the flare thereof with the magnifying lens positioned at the juncture of the neck and the flare and a magnetic device positioned at the bend for creating a unidirectional magnetic field across the bend to turn the beam through the angle of the bend. This greatly reduces the overall depth of the tube.

Figure 1:
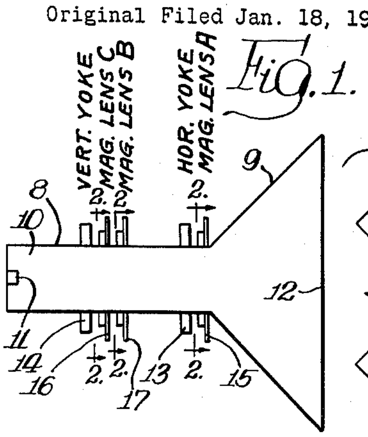
Fig. 1 is a schematic representation of a cathode-ray image reproducer incorporating the system of the present invention.

The arrangement of Fig. 1 includes a cathode-ray tube image reproducer 10 having an electron beam source in the form of a gun 11 at one end thereof, of the type generally used with axial magnetic focusing systems, and having a target area in the form of a fluorescent viewing screen 12 at its other end. The source 11 emits a slightly divergent beam. A horizontal deflection yoke 13 is positioned about the neck 8 of the tube near the junction of the neck 8 with a flare 9 of the tube. This yoke includes a horizontal deflection winding which sets up a deflection field within the tube for scanning the beam in the horizontal direction. A vertical deflection yoke 14 is mounted on the neck of the tube 10, and is spaced axially from the yoke 13 a substantial distance in the direction of source 11. Yoke 14 has only a vertical deflection winding which provides a vertical deflection field in the tube for scanning the beam in the vertical direction. The yoke 14 is mounted in a position rotated 180° from the usual mounting of the vertical yoke so that it inverts the picture vertically.

The yokes 13 and 14 are square toroidal yokes with two lumped, bobbin-wound coils. The yoke 14 has permanent magnets inserted in series with the flux path to cause a fixed deflection of the beam to the top of the target area 12 when no current flows through the coils of the yoke 14. This allows the yoke 14 to be driven directly from the plate circuit of the vertical deflection output amplifier tube without the use of a transformer since the permanent magnets obviate the need for blocking the direct current component of the amplifier tube. Since the yokes 13 and 14 are separately mounted, the lower frequency of the vertical yoke 14 permits its core to be made of inexpensive laminated iron, and the core of the horizontal yoke 13 can be made of much less ferrite than would be necessary if the two yokes were both on the same core.

A permanent magnet magnifying lens 15 (designated A) is mounted on the neck of the cathode-ray tube adjacent to yoke 13 and between it and the viewing screen 12. The lens 15 is mounted at the junction of the neck 8 and flare 9 of the tube 10, which is the usual deflection center of a cathode-ray tube. This lens 15 is similar to that described in the copending application referred to previously herein, and it sets up a magnetic field within the cathode-ray tube which is effective to invert and magnify the vertical deflection and to magnify the hornizontal deflection.

A crossed set of permanent magnet lenses 16 and 17 form focusing lenses. The permanent magnet lens 16 (designated C) is similar to lens 15 and is positioned between the yokes 13 and 14 and adjacent to yoke 14, this lens 16 having the same angular orientation as lens 15. The third permanent magnet lens 17 (designated B) is positioned adjacent to lens 16, between that lens and yoke 13, lens 17 being similar to the lenses 15 and 16 but being displaced angularly by 90° with respect thereto, so that its fields have effects on the horizontal and vertical dimensions of the beam opposite to the effects thereon of the lenses 15 and 16. It is preferable for lens 15 to be stronger than lens 17, and lens 17 in turn, to be stronger than lens 16.

Figure 2:
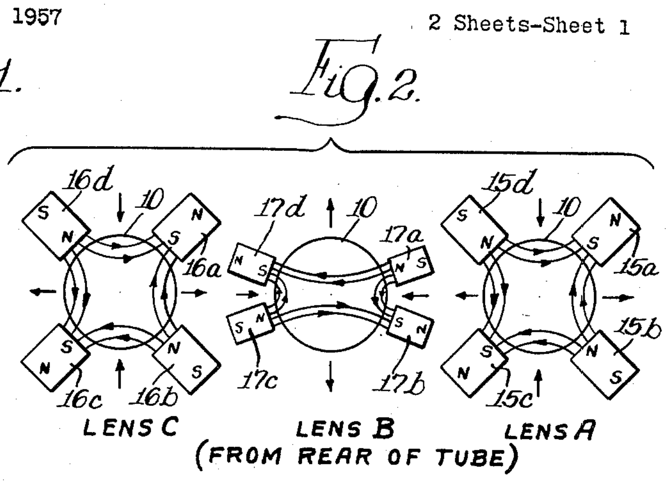
Fig. 2 shows schematically the various fields set up in the neck of the reproducer by the permanent magnet lenses of the invention.

The three lenses 15 (A), 17 (B), and 16 (C), are shown in Fig. 2. Lens 15, for example, is made up of four radially disposed permanent magnets 15*a*, 15*b*, 15*c*, and 15*d*. Magnets 15*a* and 15*c* are diametrically opposite to one another and present south poles to the neck of tube 10, magnets 15*b* and 15*d* are also diametrically opposite to one another and present north poles to the neck of tube 10. As shown in Fig. 2, the field set up by the lens A is such that magnification or divergence, both as to focus and deflection (indicated by the horizontal arrows) is realized in the horizontal dimension, whereas compression or convergence, both as to focus and deflection (represented by the vertical arrows) is realized in the vertical dimension. This compression acts to invert and magnify the vertical deflection of the beam thereby increasing the vertical dimension of the reproduced image and the diverging effect horizontally increases the horizontal scan so that magnification in both the horizontal and vertical directions may be realized. However, this magnifying lens produces a divergent focal action on the beam in the horizontal dimension, and in the vertical dimension, makes the desired focus occur before the screen 12. These defocus effects are compensated and the desired sharpness of focus, both vertically and horizontally, is obtained by the crossed set of magnetic lenses 16 and 17.

Lens B (Fig. 2) consists of four permanent magnets 17*a*, 17*b*, 17*c*, and 17*d*, and, as previously noted, it is oriented 90° with respect to lens A so that its fields are in the opposite direction. The magnets of lens B are angularly oriented to be more adjacent to the horizontal transverse axis than to the vertical axis. This causes the precisely desired vertical diverging deflection and divergence focus-wise, which is less than that obtainable if the magnets were closer together horizontally, and also causes horizontal convergence of the beam to bring it to the lens 15 at the desired angle focuswise. The location of the magnets 17*a* and 17*d* at a wide angle relative to one another and the magnets 17*b* and 17*c* also at the same wide angle causes the vertically deflecting fields, one between the magnets 17*a* and 17*d* and the other between the magnets 17*b* and 17*c* to increase in strength proceeding vertically from a horizontal plane at the center of the tube outwardly at a rate less than a linear rate of increase. This less than linear rate of increase of the strengths of the fields compensates for the inherently greater than linear increase of the vertically deflecting fields of the lens 15 so that distortion by the lens 15 near the periphery of the lens 15, which corresponds to spherical aberration in optical lenses, is corrected.

Lens C comprises four permanent magnets 16*a*, 16*b*, 16*c*, and 16*d*, and this lens, as previously mentioned, is oriented to the same angular position as the lens A so that its field components are in the same direction as lens A. Moreover, the individual magnets of lens C have the same angular displacement as in lens A. Since the lens 16 is spaced substantially from the lens 15 in order to fit the yoke 13 therebetween, the combined effect of the lenses 15 and 16 is not perfect, and the lens 17 is provided to cut down the effect of the lens 16 somewhat and perfect the combined effect of the lenses 15 and 16.

Figures 3, 4, 5, 10:
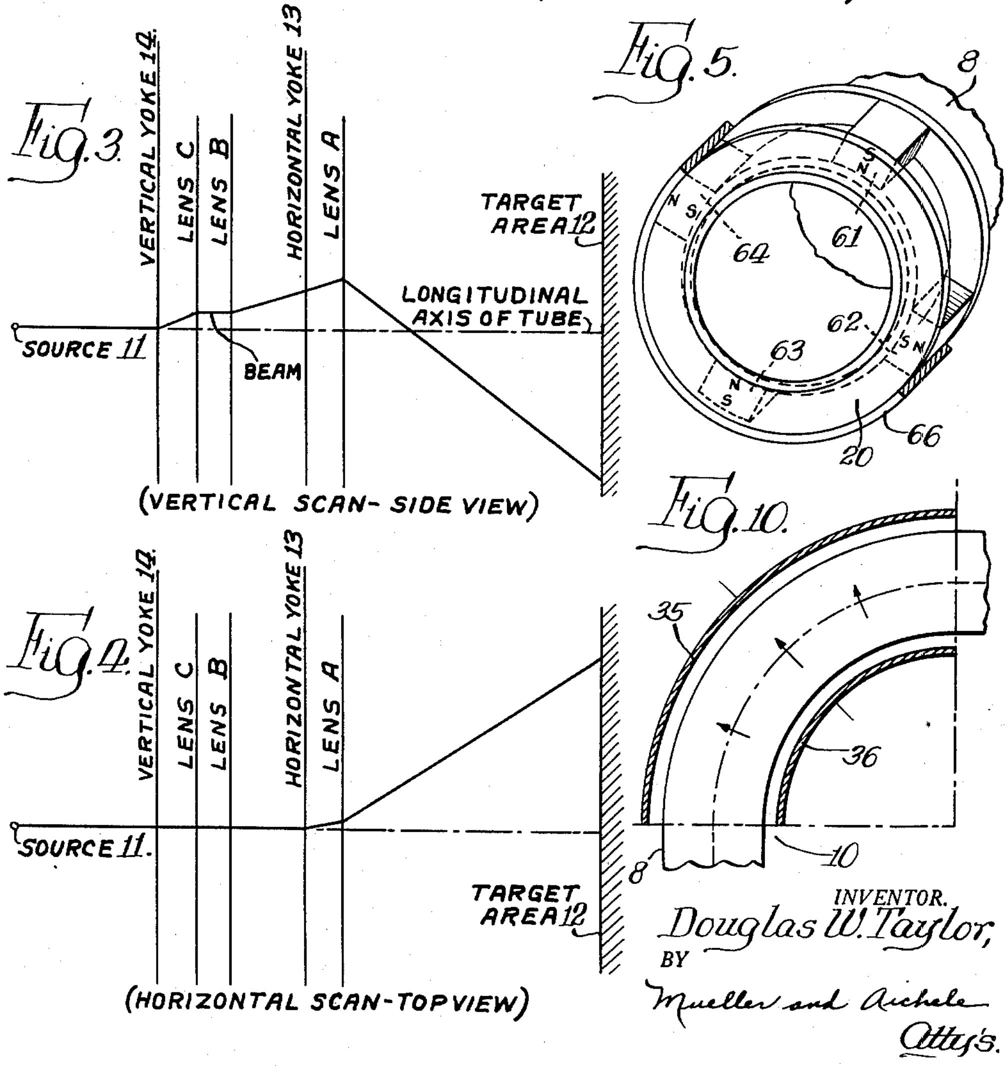
Fig. 3 shows the effect of the system on the vertical scanning in the reproducer.
Fig. 4 shows the effect of the system on the horizontal scanning.
Fig. 5 shows a suitable mechanical mounting arrangement for each of the permanent magnet lenses shown in Figs. 1 and 2.
Fig. 10 is an enlarged fragmentary view of a cathode-ray tube image reproducer forming a modification of the reproducer shown in Fig. 8.

The effect of the system of the invention on the vertical and horizontal scanning may best be understood by a consideration of Figs. 3 and 4. Fig. 3 is a somewhat schematic view of the cathode-ray beam taken from the side to show its travel and vertical deflection as it leaves source 11 on its way to the target area 12. The beam first comes under the influence of the vertical yoke 14 which deflects it in the vertical direction. The lens 16 is oriented so as to turn the beam vertically to a lesser angle with the axis of the tube. The beam then comes under the influence of lens 17, which is oriented to vertically diverge the beam both deflectionwise and focuswise so that it is again directed away from the axis until it reaches the yoke 13. The yoke 13 has no effect on the vertical direction of the beam as it has only a horizontal deflection winding. The beam then comes under the influence of lens 15 which, as in the copending application, reverses its scanning direction and causes it to cross the longitudinal axis and meet the target area on the other side of that axis, effectively to invert the vertical dimension of the reproduced image and cause magnification in the vertical direction. It will be noted that the effectiveness of lens 15 is determined by the distance the beam is from the longitudinal axis of the tube, and that yoke 14 and lens 17 are the effective components in directing the beam into the field of lens 15 that will produce magnified scanning of the beam in the inverted vertical direction. Because the vertical yoke 14 is spaced a substantial distance from the lens 15, the beam, when deflected vertically from the axis of the tube, is farther from that axis as the beam enters the lens 15 than it would be if the yoke 14 were spaced closer to the lens 15. The vertically inverting fields of the lens 15 become progressively stronger proceeding outwardly from the axis of the tube. Hence, the removed position of the yoke 14 from the lens 15 places the beam out into a stronger inverting portion of the fields away from the tube axis and this causes the inverting effect on the deflection to be greater. That is, the inverting effect of the lens 15 is enhanced by the large distance between the vertical yoke 14 and the lens 15. The effect of this throw vertically is to deflect the beam into portions of the fields of the lens 15 that increase greater than linearly proceeding toward the periphery of the neck 8 of the tube. This would cause the beam to focus prior to arrival at the target area 12. But the lens 17 has horizontal fields which increase in strength at less than a linear rate proceeding away from the axis of the tube toward the periphery of the neck. Also, the path of the beam from the lens 15 to the target area 12 is longer for a larger deflection angle than for smaller deflection angle so that if focus convergence were constant for the entire scan, the focus would be prior to the target area at the wider angles when set to be focused on the target area at the smaller angles. This effect in the vertical scan is also prevented by the vertical non-linearity of the lens 17.

The lens 17 increases the vertical scanning deflection, and also focally converges the beam horizontally. The effect of the lens 17 on the vertical focus of the beam is to diverge it focally sufficiently to compensate for the strong focally converging effect of the lens 15. The lens 16 cooperates with the lenses 15 and 17 to obtain precise vertical and horizontal focusing.

Considering now the horizontal scan, as shown in Fig. 4, the beam is not deflected horizontally by yoke 14 because that yoke contains only a vertical winding. The beam, therefore, passes through the yoke and through the lenses 16 and 17 which also have no effect on the horizontal scanning. The beam then passes to the yoke 13 where it is deflected in the horizontal direction to obtain only part of the scanning deflection desired, which is completed by the lens 15, which produces the magnification described in the copending application. However, and as noted above, lenses 15 and 16 produce a divergent focal effect on the beam in the horizontal direction, but lens 17 produces fields that horizontally converge the beam so that it may be focused on the plane of target 12. The beam, therefore, by the joint action of the arrangement of Fig. 1 is brought to a sharp point focus in the plane of the target 12.

Figure 6:
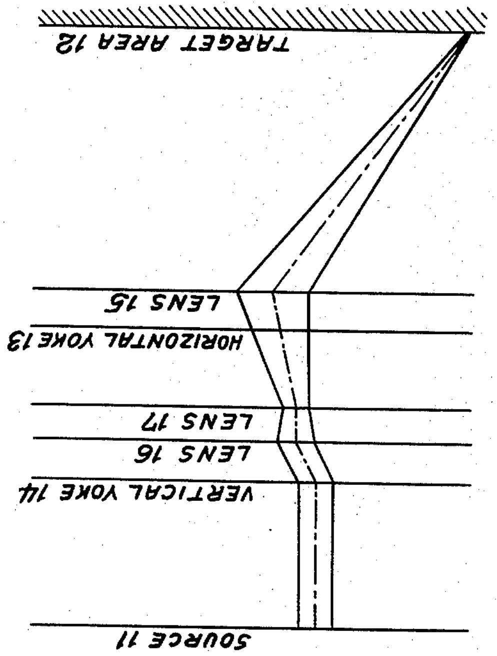
Fig. 6 shows the effect of the system on the focus of the beam in the vertical dimension.
Figure 7:
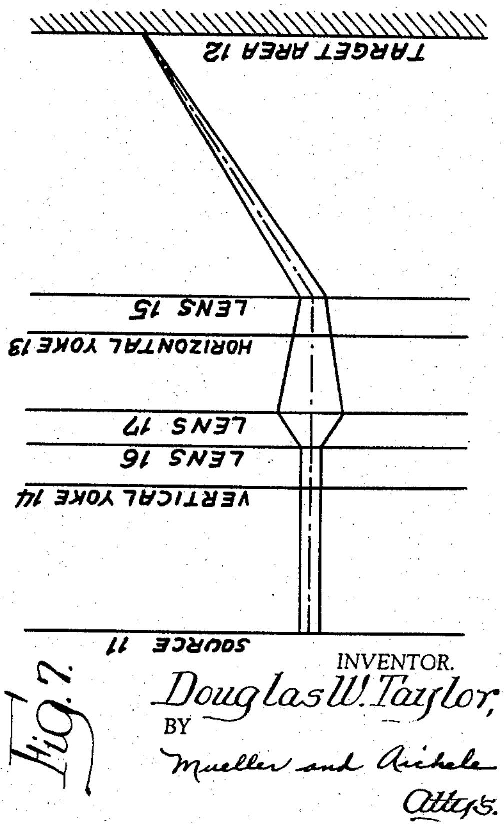
Fig. 7 shows the effect of the system on the focus of the beam in the horizontal dimension.

As illustrated in Figs. 6 and 7, the lenses 16 and 17 have a combined effect on the beam such that, vertically (Fig. 6), the beam is diverging relative to its centerline just sufficiently that the compressing effect of the magnifying lens 15 converges the beam only to the desired extent at the target area 12 and prevents crossover of the beam at a point well short of the target area 12, which would occur in the absence of the lenses 16 and 17. Horizontally (Fig. 7), the focusing set of lenses 16 and 17 converge the beam as it arrives at the lens 15 to an extent that the beam leaves the lens 15 in a converging condition to focus the beam at the target area 12.

Summarizing, the beam is directed from the source 11 along the longitudinal axis of the tube 10. The vertical yoke 14 deflects the beam vertically inversely with respect to the picture to be formed, and does not deflect the beam horizontally at all. Then the magnetic lens 16 diverges the beam horizontally while reducing the vertical deflection thereof, after which the magnetic lens 17 magnifies the vertical deflection of the beam and concentrates the beam horizontally. Then the yoke 13 deflects the beam horizontally in accordance with the signal applied thereto, but less than is desired to form the picture on the screen 12. The beam travels through the lens 15 which effects the further horizontal deflection and inverts the beam vertically to the desired extent. Next the beam strikes the screen 12 at the precise point desired in a sharply focused condition.

One structural embodiment that may be used for any of the magnetic lenses 15, 16, or 17 is shown in Fig. 5. This structure includes, for example, a spool 20 of plastic or other non-magnetic material with four radially extending permanent magnets 61, 62, 63 and 64, frictionally held by the spool around the neck 8 of the tube 10. These magnets are positioned, in each instance, so that they exhibit the desired poles illustrated in Fig. 2 to the neck of the tube. When desired, the magnets can be surrounded by a ring 66 of the ferrous or other magnetizable material (Fig. 5) which cuts down stray magnetic fields and their adverse effects. Such a ring may be mounted to be axially adjustable to provide a manual control for the field strength of the lens.

The lens 15 is positioned at the juncture of the neck 8 and the flare 9 and locates the virtual deflection center at that juncture. This permits the yokes 13 and 14 to be located back along the neck such distances that the yokes need to scan through substantially smaller scanning angles. The scan excursion is such that it is just within the neck at the plane of the lens 15. By the locations of the yokes back from the lens 15, the beam when deflected from the axis of the tube is caused to intercept the stronger portions of the fields of the lens 15 than would occur if the yokes were spaced close to the lens 15. This causes a greater magnification by the lens 15, which is caused by the increased field strength of the lens 15 nearer the periphery of the neck.

It has been found that the best configuration results when the permanent magnet poles of lenses 15 and 16 are angularly displaced 45° on either side of a vertical plane through the axis of the tube, and when the poles of lens 17 are angularly displaced by about 85° on either side of the vertical plane through the axis.

In a specific embodiment of the invention, the field gradient of lens 15 from the center of the tube was 100 gauss/cm., the field gradient of lens 17 was 90 gauss/cm., and the field gradient of lens 16 was 80 gauss/cm. These values were obtained with the anode of the reproducer at 19 kv., and slight adjustments were made to bring the beam sharply into focus. The lens 16 was spaced about 1 inch from the vertical yoke 14, the distance between the lenses 16 and 17 was about 1 inch, the distance between the lens 17 and the horizontal yoke 13 was about 2 inches, and the distance between the yoke 13 and the lens 15 was about 1 inch.

Figures 8, 9:
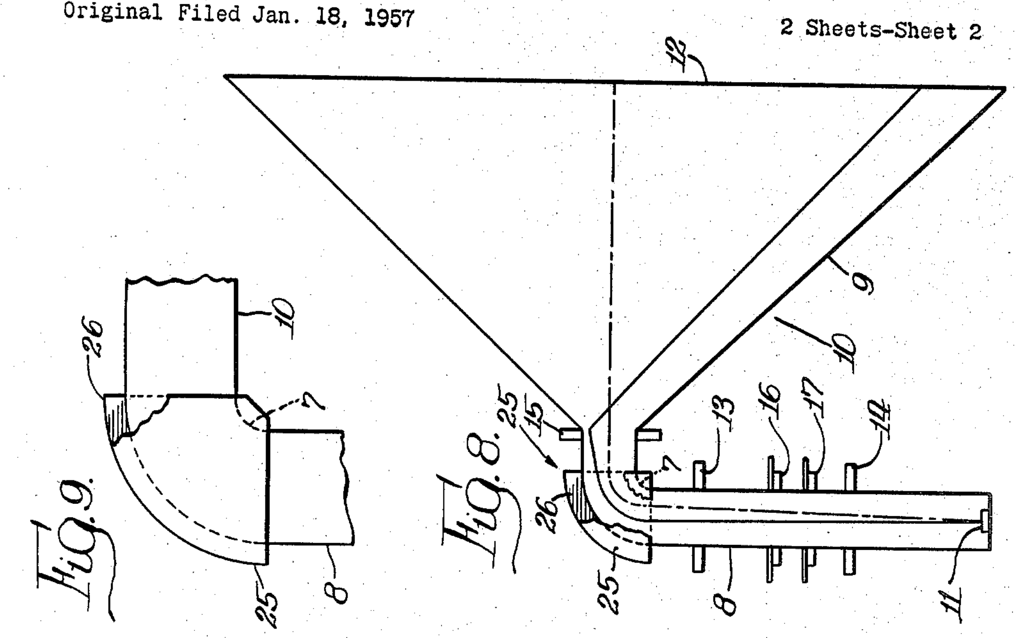
Fig. 8 is a schematic representation of a cathode-ray tube image reproducer forming an alternate embodiment of the invention and including a bent neck portion to greatly shorten the overall length of the tube.
Fig. 9 is an enlarged fragmentary view of the reproducer shown in Fig. 8.

In the cathode-ray tube reproducer shown in Fig. 8, a tube 10 has a neck 8, a flare 9, a beam-producing gun 11, and a target area 12. The neck 9 has a sharp vertical bend 7 close to the junction of the flare 9 and neck 8, at which junction a magnifying lens 15 is mounted. A vertical yoke 14 is mounted near the lower end of the neck, and a horizontal yoke 13 is mounted near the upper end of the neck with a set of crossed magnetic lenses 16 and 17 positioned between the two yokes 13 and 14. The elements 13, 14, 15, 16 and 17 are similar in structure and function to the corresponding numbered elements shown in Fig. 1. Opposed permanent magnets 25 and 26 create a uniform strength, horizontally directed, field across the entire bend 17 in such a direction and of such strength that the beam is deflected 90° in a clockwise direction to the lens 15, which inverts and magnifies the beam deflection vertically and magnifies the beam deflection horizontally. The direction of the field created by the magnets 25 and 26 which also may be electromagnet, is horizontal since the bend is vertical. The magnets 25 and 26 are wedge-shaped so that the entire bend is covered by the field. The field created across the tube is of uniform strength and thickness from one side thereof to the other. In one specific example, the diameter of the neck 8 was about 1½ inches, the length of the portion of the neck between the junction of the neck and flare and the bend was about ½ inch, the length of the vertical portion of the neck 8 was about 7 inches, the distance from the yoke 13 to the bend 7 was about 1 inch, that from the yoke 13 to the lens 16 was about 2 inches, that from the yoke 13 to the lens 17 was about 3 inches, and that from the yoke 13 to the yoke 14 was about 4 inches. The strengths of the lenses 15, 16, and 17 were similar to those of the lenses 15, 16, and 17 shown in Fig. 1.

A modification of the system shown in Fig. 8 is shown in Fig. 10 and is similar to the modification shown in Fig. 8, except that electroconductive plates 35 and 36 are substituted for the magnets 25 and 26 and are connected to a suitable direct current voltage source (not shown) to create an electrostatic field across the entire bent portion of the neck 8 of the tube 10. This field, being electrostatic, is in directions along the radii of the bend and is wedge-shaped, so that the entire bend, and only the bend, is covered by the field. This field bends the beam around the bend in the neck 8. The neck 8 is shown bending downwardly but may be bent upwardly or to one side with a corresponding shift of the electrostatic field.

The invention provides, therefore, an improved system for producing magnification of the image of a cathode-ray tube, and which magnification may be produced without any appreciable defocusing or overfocusing of the beam.

I claim:

1. In a display system which includes a cathode-ray tube having a source of a cathode-ray beam at one end and further having a target area at its other end; the combination of first deflection means for establishing a first deflection field within the tube for scanning the beam across the target area in a first direction, second deflection means spaced axially along the tube from said first deflection means in the direction of said target area for establishing a second deflection field within the tube for scanning the beam across the target area in a second direction perpendicular to said first direction, thereby to produce an image on the target area having a first dimension and a second dimension, first lens means for producing fields within the tube between said second deflection field and the target area for inverting said first dimension of said image and for magnifying said second dimension thereof, the fields of said first lens means tending to converge the beam focus in said first direction and to diverge the beam focus in said second direction, and second lens means positioned between said first scanning means and said second scanning means for producing fields within the tube for converging the beam focus in the second direction to overcome the divergence thereof by said first lens means in such direction.

2. In a television system which includes a cathode-ray image reproducer having a source of a cathode-ray beam at one end and further having a fluorescent viewing screen at its other end; the combination of first electromagnetic deflection means for establishing a first magnetic deflection field within the reproducer for scanning the beam across the screen in the vertical direction, second electromagnetic deflection means spaced axially along the reproducer from said first deflection means in the direction of the screen for establishing a second magnetic deflection field within the reproducer for scanning the beam across the screen in the horizontal direction, thereby to produce an image on the screen having a vertical dimension and having a horizontal dimension, first permanent magnet lens means for producing magnetic fields within the reproducer between said second deflection field and the screen for inverting the vertical dimension of the image and for magnifying the horizontal dimension thereof, said first lens means tending to converge the beam focus in the vertical direction and to divert the beam focus in the horizontal direction, and second permanent-magnet lens means positioned between said first scanning means and said second scanning means for producing magnetic fields within the reproducer for converging the beam focus in the horizontal direction to overcome the divergence thereof by said first lens means in such horizontal direction.

3. The combination defined in claim 2 which includes a third permanent-magnet lens positioned between said first deflection means and said second lens for producing magnetic fields in the reproducer which assists in maintaining the beam converged in the vertical direction.

4. The combination of claim 3 in which said first permanent-magnet lens is stronger than said second permanent-magnet lens, and said second permanent-magnet lens is stronger than said third permanent-magnet lens.

5. In a television system including a cathode-ray image-reproducer having a source of a cathode ray beam at one end and also being provided with a target area at the other end thereof, the combination therewith of vertical deflection means positioned at a portion of said reproducer adjacent to said source for deflecting the beam vertically and inversely with respect to a picture to be formed on said target area, horizontal deflection means spaced along said reproducer from said vertical deflection means and on the side of said vertical deflection means farther removed from said source, a first magnetic lens positioned between said horizontal deflection means and said vertical deflection means for focusing the beam vertically, a second magnetic lens positioned between said first magnetic lens and said horizontal deflection means for magnifying the vertical deflection of the beam, and a third magnetic lens positioned between said horizontal deflecting means and the target area for magnifying the horizontal deflection of the beam and for inverting the vertical deflection of the beam.

6. In a television system including a cathode-ray image-reproducer having a source of a cathode ray beam at one end and also being provided with a target area at the other end thereof, the combination therewith of vertical deflection means positioned at a portion of said reproducer adjacent to said source for deflecting the beam vertically and inversely with respect to a picture to be formed on said target area, horizontal deflection means spaced along said reproducer from said vertical deflection means and on the side of said vertical deflection means farther removed from said source, a first focusing magnetic lens positioned between said horizontal deflection means and said vertical deflection means, said focusing magnetic lens including four magnets so positioned as to diverge the beam focus horizontally and reduce vertical deflection thereof, said focusing magnetic lens also converging the beam focus vertically, a vertical deflecting magnetic lens positioned between said first magnetic lens and said horizontal deflection means, said vertical deflecting magnetic lens including four magnets so positioned as to magnify the vertical deflection of the beam and converge the beam focus horizontally, and a third magnetic lens positioned beyond said horizontal deflecting means for magnifying the horizontal deflection of the beam and for inverting the vertical deflection of the beam.

7. In a television system including a cathode-ray image-reproducer having a source of a cathode ray beam at one end and also being provided with a target area at the other end thereof, the combination therewith of vertical deflection means at a portion of said reproducer spaced from said source for deflecting the beam vertically and inversely with respect to a picture to be formed on said target area, horizontal deflection means spaced along said reproducer from said vertical deflection means and on the side of said vertical deflection means farther removed from said source, and a magnetic magnifying lens positioned beyond said horizontal deflecting means from said vertical deflection means for magnifying the horizontal deflection of the beam and for inverting and magnifying the vertical deflection of said beam, said magnifying lens creating fields increasing in strength from the axis of the tube toward the outer portion of the tube, said deflection means being spaced from said magnifying lens a distance sufficient that the beam enters a strong portion of the field of said magnifying lens whenever said deflection means deflects said beam vertically from the axis of said reproducer.

8. In a television system including a cathode-ray image-reproducer having a source of a cathode ray beam at one end and also being provided with a target area at the other end thereof, the combination therewith of vertical deflection means at a portion of said reproducer spaced from said source for deflecting the beam vertically and inversely with respect to a picture to be formed on said target area, horizontal deflection means spaced along said reproducer from said vertical deflection means and on the side of said vertical deflection means farther removed from said source, a magnetic magnifying lens positioned beyond said horizontal deflecting means from said vertically deflecting magnetic lens for magnifying the horizontal deflection of the beam and for inverting the beam vertically and magnifying the vertical deflection of the beam, and a set of crossed magnetic lenses positioned between said vertical deflection means and said horizontal deflection means for converging the beam horizontally as it approaches said magnifying lens to prevent horizontal defocus of the beam by the magnifying lens and for diverging the beam vertically as it approaches said magnifying lens to prevent vertical defocus of the beam by said magnifying lens.

9. In a display system which includes a cathode-ray tube having a source of a cathode-ray beam at one end and further having a target area at its other end; the combination of deflection means for establishing a deflection field within the tube for scanning the beam across the target area in one dimension, a first magnetic lens for producing fields within the tube near the periphery of the tube of greater than linearly increasing strength in a direction proceeding from the axis of the tube outwardly and positioned between said deflection means and said target area for inverting said one dimension of said image, and a second magnetic lens positioned between and spaced from said deflection means and said first magnetic means for creating fields opposite to the fields of said first magnetic lens and of less than linearly increasing strength proceeding from the axis of the tube outwardly to compensate for the non-linearity of the field of said first magnetic lens.

10. In a television system which includes a cathode-ray image-reproducer having a source of a cathode-ray beam at one end and further having a fluorescent viewing screen at its other end; the combination of first electromagnetic deflection means for establishing a first magnetic deflection field within the reproducer for scanning the beam across the screen in the vertical direction, a second electromagnetic deflection means spaced axially along the reproducer from said first deflection means in the direction of the screen for establishing a second magnetic deflection field within the reproducer for scanning the beam across the screen in the horizontal direction, thereby to produce an image on the screen having a vertical dimension and having a horizontal dimension, a first permanent magnet lens for producing magnetic fields within the reproducer between said second deflection field and the screen for inverting the vertical dimension of the image and for magnifying the horizontal dimension thereof, said first lens tending to converge the beam in the vertical direction and to diverge the beam in the horizontal direction, and a second permanent-magnet lens means positioned between said first scanning means and said second scanning means for producing magnetic fields within the reproducer for converging the beam in the horizontal direction to overcome the divergence thereof by said first lens in such horizontal direction and for diverging the beam in the vertical direction to overcome the convergence thereof by said first lens.

11. In a system including a cathode-ray tube having a neck and a beam source at one end of the neck and also having a target area at the other end of the neck, the combination therewith of magnifying magnetic lens means spaced along the neck from the beam source, a horizontal yoke between said lens means and said source, focus-compensating magnetic lens means positioned between said horizontal yoke and said source, and a vertical yoke positioned between said focus-compensating lens means and said source.

12. In a television system including a cathode-ray tube image-reproducer having a source of a cathode ray beam at one-end and also being provided with a target area at the other end thereof, the combination therewith of vertical deflection means positioned at a portion of said reproducer adjacent to said source for deflecting the beam vertically and inversely with respect to a picture to be formed on said target area, horizontal deflection means spaced along said reproducer from said vertical deflection means and on the side of said vertical deflection means farther removed from said source, a first focusing magnetic lens positioned between said horizontal deflection means and said vertical deflection means, said focusing magnetic lens including four magnets so positioned as to diverge the beam horizontally and reduce vertical deflection thereof, and also to converge the beam focus vertically, a vertically deflecting magnetic lens positioned between said first magnetic lens and said horizontal deflection means, said vertically deflecting magnetic lens including four magnets so positioned as to magnify the vertical deflection of the beam and converge the beam horizontally, a third magnetic lens positioned beyond said horizontal deflecting means from said vertically deflecting magnetic lens for magnifying the horizontal deflection of the beam and for inverting the beam scan vertically, said tube having a bend in the neck thereof between said third magnetic lens and said horizontal deflecting means, and means creating an electric field in said bend to turn the beam around the bend.

13. In a television system including a cathode-ray tube having an electron source at one end for directing an electron beam toward a target area provided at the other end thereof, the combination including, first deflection means spaced along the tube from the electron source for deflecting the beam along a first axis, second deflection means spaced farther from the electron source than said first deflection means for deflecting the beam along a second axis perpendicular to the first, a first lens positioned between said second deflection means and the target area for magnifying the deflection along said first and second axes, and a crossed-field lens system including a second lens and a third lens positioned between said first and second deflection means and correcting for focusing aberrations imposed on the beam by said first lens, so that the beam strikes the target in a sharply focused condition.

14. The combination defined in claim 13 wherein the cathode-ray tube has a bend between the ends thereof and with said first lens being positioned on the target side of the bend, and further including means for creating an electric field across the bend to turn the beam into said first lens.

15. A deflection system for a cathode-ray tube having a beam source at one end thereof and a target area at the other end, such system including in combination, first deflection means positioned along the path of the beam for deflecting the beam in one direction, focus-compensating lens means providing a field about the deflected beam, second deflection means positioned along the beam path beyond said lens means for deflecting the beam in a second direction perpendicular to said one direction, and magnifying lens means providing a field for magnifying the deflection of the beam in said second direction.

16. A deflection system for a cathode ray tube having a neck with a beam source at one end of the neck and a bend at the other end thereof, and with a flared portion joined to the bend having a target at the large end of the flared portion, such system including in combination, first deflection means positioned along the tube neck between the bend and the beam source for deflecting the beam in one direction, focus compensating magnetic lens means positioned along the tube neck between said first deflection means and the beam source, second deflection means positioned along the tube neck between said lens means and the beam source for deflecting the beam in a second direction perpendicular to said one direction, means for creating a field across the bend in the tube neck to turn the deflected beam therein, and magnetic magnifying lens means at the junction of the bend and the flared portion for magnifying the deflection of the beam as the beam passes through the flared portion to the target.

17. A deflection system for a cathode ray tube having a neck with a beam source at one end of the neck and a bend at the other end thereof, and with a flared portion joined to the bend having a target at the large end of the flared portion, such system including in combination, first and second deflection means positioned along the tube neck between the bend and the beam source for deflecting the beam in first and second directions at right angles to each other, focus compensating lens means positioned along the tube neck between the bend and the beam source, means for creating a field across the bend in the tube neck to turn the deflected beam therein, and magnifying lens means at the junction of the bend and the flared portion for magnifying the deflection of the beam as the beam passes through the flared portion to the target.

References Cited in the file of this patent

UNITED STATES PATENTS

| | | |
|---|---|---|
| 2,464,562 | Diemer | Mar. 15, 1949 |
| 2,892,962 | Ross | June 30, 1959 |

FOREIGN PATENTS

| | | |
|---|---|---|
| 315,362 | Great Britain | Feb. 12, 1931 |
| 109,216 | Sweden | Dec. 7, 1943 |
| 699,988 | Germany | Dec. 11, 1940 |